United States Patent
Vasudevan et al.

(10) Patent No.: US 10,353,631 B2
(45) Date of Patent: Jul. 16, 2019

(54) TECHNIQUES FOR MOVING DATA BETWEEN A NETWORK INPUT/OUTPUT DEVICE AND A STORAGE DEVICE

(71) Applicant: Intel Corporation, Santa Clara, CA (US)

(72) Inventors: Anil Vasudevan, Portland, OR (US); Dave B. Minturn, Hillsboro, OR (US); Kiran Patil, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 126 days.

(21) Appl. No.: 13/948,715

(22) Filed: Jul. 23, 2013

(65) Prior Publication Data

US 2015/0032841 A1    Jan. 29, 2015

(51) Int. Cl.
G06F 15/167 (2006.01)
G06F 3/06 (2006.01)

(52) U.S. Cl.
CPC ............ *G06F 3/0661* (2013.01); *G06F 3/067* (2013.01); *G06F 3/0613* (2013.01); *G06F 3/0646* (2013.01); *G06F 3/0679* (2013.01)

(58) Field of Classification Search
CPC ..... H04L 49/30; H04L 49/109; G06F 3/0688; G06F 3/0656
See application file for complete search history.

(56) References Cited

U.S. PATENT DOCUMENTS

| | | | |
|---|---|---|---|
| 8,775,718 B2* | 7/2014 | Kanevsky | G06F 3/061 370/389 |
| 9,047,178 B2* | 6/2015 | Talagala et al. | |
| 2010/0299459 A1 | 11/2010 | Tripathi et al. | |
| 2012/0278538 A1* | 11/2012 | Nango et al. | 711/103 |
| 2013/0091330 A1* | 4/2013 | Mital et al. | 711/130 |
| 2013/0339583 A1* | 12/2013 | Shin et al. | 711/103 |
| 2014/0040527 A1* | 2/2014 | Kanigicherla et al. | 710/316 |
| 2014/0281123 A1* | 9/2014 | Weber | 711/103 |

FOREIGN PATENT DOCUMENTS

| | | |
|---|---|---|
| CN | 1997033 A | 7/2007 |
| CN | 101019120 A | 8/2007 |
| CN | 101165667 A | 4/2008 |
| CN | 101455040 A | 6/2009 |

* cited by examiner

*Primary Examiner* — Brian Whipple
*Assistant Examiner* — Tesfu N Mekonen

(57) ABSTRACT

Examples are disclosed for moving data between a network input/output (I/O) device and a storage subsystem and/or storage device. In some examples, a network I/O device coupled to a host device may receive a data frame including a request to access a storage subsystem or storage device. The storage subsystem and/or storage device may be located with the network I/O device or separately coupled to the host device through a storage controller. One or more buffers maintained in a cache for processor circuitry may be used to exchange control information or stage data associated with the data frame to avoid or eliminate use of system memory to move data to or from the storage subsystem and/or storage device. Other examples are described and claimed.

22 Claims, 7 Drawing Sheets

System 100

500

RECEIVE, AT A NW I/O DEVICE COUPLED TO A HOST DEVICE, A DATA FRAME INCLUDING A REQUEST TO ACCESS A STORAGE SUBSYSTEM MAINTAINED AT THE NW I/O DEVICE, THE STORAGE SUBSYSTEM INCLUDING AN SSD
502

UTILIZE ONE OR MORE BUFFERS MAINTAINED IN A CACHE FOR PROCESSOR CIRCUITRY INCLUDED IN A PROCESSOR SOCKET AT THE HOST DEVICE, THE ONE OR MORE BUFFERS ARRANGED TO EXCHANGE CONTROL INFORMATION FOR THE REQUEST, THE CONTROL INFORMATION EXCHANGED WITH A PROTOCOL STACK EXECUTED BY THE PROCESSOR CIRCUITRY
504

DETERMINE WHETHER TO READ FROM OR STORE TO THE STORAGE SUBSYSTEM DATA ASSOCIATED WITH THE REQUEST BASED ON THE EXCHANGED CONTROL INFORMATION
506

TAG ONE OR MORE BUFFERS MAINTAINED IN A CACHE FOR PROCESSOR CIRCUITRY INCLUDED IN A PROCESSOR SOCKET AT A HOST DEVICE, THE ONE OR MORE BUFFERS TAGGED BY A NW I/O DEVICE COUPLED TO THE HOST DEVICE TO INDICATE USE OF THE ONE OR MORE BUFFERS FOR STAGING DATA RECEIVED OR TRANSMITTED VIA ONE OR MORE NETWORK CONNECTIONS COUPLED TO THE NW I/O DEVICE, THE DATA ASSOCIATED WITH REQUESTS TO ACCESS A STORAGE DEVICE CONTROLLED BY A STORAGE CONTROLLER COUPLED TO THE HOST DEVICE
*602*

RECEIVE A DATA FRAME INCLUDING A REQUEST BY A REMOTE DEVICE TO ACCESS THE STORAGE DEVICE
*604*

FORWARD TO OR RECEIVE FROM THE ONE OR MORE TAGGED BUFFERS DATA ASSOCIATED WITH THE REQUEST BASED ON WHETHER THE REQUEST IS TO READ THE DATA FROM THE STORAGE DEVICE OR IS TO STORE THE DATA TO THE STORAGE DEVICE
*606*

FIG. 6

TECHNIQUES FOR MOVING DATA BETWEEN A NETWORK INPUT/OUTPUT DEVICE AND A STORAGE DEVICE

TECHNICAL FIELD

Examples described herein are generally related to storing or reading data from a storage subsystem based on a request included in a received data frame.

BACKGROUND

Networking and storage are becoming more and more intertwined as computing devices are deployed in highly distributed modes of operation. For example, stored data may be distributed across many computing devices or network nodes for a given network. The given network may be configured as a type of cloud-based service such as software as a service (SAAS) or infrastructure as a service (IAAS). Typically, storage and network subsystems for individual network nodes are architecturally designed as separate subsystems. As a result of being on separate subsystems, data arriving from the network to storage at a given network node or vice versa needs to be routed between the subsystems. Often, data may be routed through system memory to move the data between the two subsystems.

BRIEF DESCRIPTION OF THE DRAWINGS

FIG. 5 illustrates an example of a first logic flow.
FIG. 6 illustrates an example of a second logic flow.

DETAILED DESCRIPTION

Figure 1:
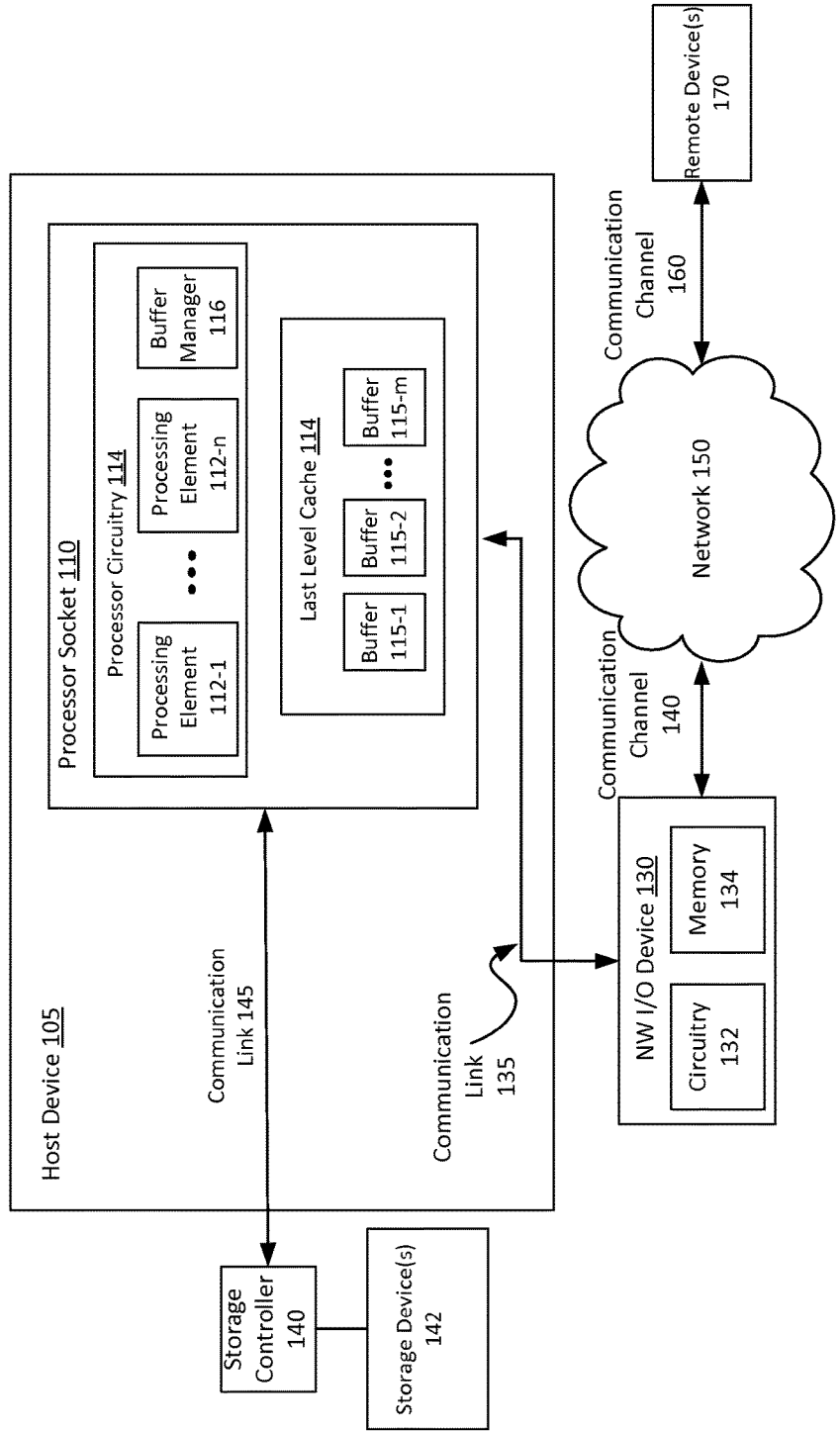
FIG. 1 illustrates a first example system.

As contemplated in the present disclosure, data received at or to be transmitted from a network node having separate network and storage subsystem may route the data through system memory. This type of routing was originally used when network data capacities (e.g., bandwidth) were such that relatively small amounts of system memory was needed to move the data between the subsystems. System memory was also needed due to somewhat high access latencies for certain types of storage to include hard disk drives. However, as network data capacities have greatly increased, larger amounts of system memory are needed to maintain an acceptable throughput performance. Overhead and latencies associated with using system memory to route the data between the subsystems may further degrade performance. Additionally, advances in non-volatile memory have enabled use in storage subsystems. Non-volatile memory may be included in such storage devices as solid state drives (SSDs) that have significantly lower access latencies. Therefore, greater network data capacities combined with lower access latencies for newer types of storage may result in use of system memory for moving data between network and storage subsystems as a less desirable and less efficient option for moving data. It is with respect to these and other challenges that the examples described herein are needed.

In some examples, techniques for moving data between a network (NW) input/out (I/O) device and a storage subsystem having one or more storage devices may be implemented. For these examples, circuitry for a NW I/O device coupled to a host device may be capable of executing various modules to facilitate movement of the data. The various modules may include a receive module to receive a data frame that includes a request to access a storage subsystem maintained at the network I/O device. The storage subsystem may include a storage device such as a solid state drive (SSD). The various modules may also include a buffer module to use one or more buffers maintained in a cache for processor circuitry included in a processor socket at the host device. The one or more buffers may be arranged to exchange control information for the request. The control information may be exchanged with a protocol stack executed by the processor circuitry. The various modules may also include a determination module to determine whether to read from or store to the storage subsystem data associated with the request based on the exchanged control information.

In some other examples, the techniques may also include tagging one or more buffers maintained in a cache for processor circuitry included in a processor socket at a host device. For these other examples, the one or more buffers may be tagged by a NW I/O device coupled to the host device to indicate use of the one or more buffers for staging data received or transmitted via one or more network connections coupled to the NW I/O device. The data may be associated with requests to access a storage device controlled by a storage controller coupled to the host device. Also, for these other examples, a data frame may be received that includes a request by a remote device to access the storage device. Data associated with the request may then be forwarded to or received from the one or more tagged buffers based on whether the request is to read the data from the storage device or the request is to store the data to the storage device.

FIG. 1 illustrates a first example system. As shown in FIG. 1 the first example system includes a system 100 having a host device 105 coupled to a NW I/O device 130 and a storage controller 140 via communication links 135 and 145, respectively. Also, as shown in FIG. 1, host device 105 may be able to couple to network 150 through NW I/O device 130 via communication channel 140. In some examples, remote device(s) 170 may establish one or more network connections through communication channel 160 coupled to network 150 and through communication channel 140 coupled to NW I/O device 130. For these examples, the one or more network connections between remote device(s) 170 and NW I/O device 130 may be used to receive data frames including requests to access a storage device (e.g., from among storage device(s) 142) controlled by storage controller 140 coupled to host device 105.

According to some examples, the terms "host computer," "host device," "host," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, and/or portions thereof. Also, in some examples, the terms "remote device" or "remote network node" may be used interchangeably, and may mean, for examples, without limitation, a computing device remotely accessible (e.g., via a network connection) to a host device.

According to some examples, a "network" such as network 150 may comprise any mechanism, instrumentality, modality, and/or portion thereof that permits, facilitates, and/or allows two or more entities to be communicatively coupled together. Also in some examples, a first entity may be "communicatively coupled" to a second entity if the first entity is capable of transmitting to and/or receiving from the second entity one or more commands and/or data (e.g., included in a data frame).

In some examples, as shown in FIG. 1, host device 105 includes a processor socket 110. Also, as shown in FIG. 1, processor socket 110 includes processor circuitry 112 and a last level cache 114. Processor circuitry 112 may include one or more processing elements 112-1 to 112-$n$ (where "n" represents any whole integer >1) and a buffer manager 116. Processing elements 112-1 to 112-$n$ may represent multiple processing cores or engines included in processing circuitry 112 and buffer manager 116 may part of a device driver in an instantiation executed by processing elements 112-1 to 112-$n$ for an operating system for host device 105. Processing elements 112-1 to 112-$n$ may be capable of using last level cache 114 including buffers 115-1 to 115-$m$ (where "m" represents any whole integer >2) to at least temporarily stage or store data. According to some examples, buffers 115-1 to 115-$m$ of last level cache 114 may either be individually assigned to a given processing element of processor circuitry 112 or may be shared among the processor elements and may include types of memory such as volatile memory having low access latencies and relatively small data capacities (e.g., static random-access memory (SRAM)). In either case, buffer manager 116 may represent logic and/or features executed by processing elements 112-1 to 112-$n$ capable of managing access to buffers 115-1 to 115-$m$ and to facilitate possible movement of data between NW I/O device 130 and storage device(s) 142 controlled by storage controller 140. Facilitation of movement of data between NW I/O device 130 and storage device(s) 142 may include buffer manager 116 maintaining at least some mapping information to map commands associated with the movement to one or more storage devices included in storage device(s) 142.

According to some examples, NW I/O device 130, as shown in FIG. 1, includes circuitry 132 and memory 134. For these examples, logic and/or features incorporated in various modules may be executed by circuitry 132 to utilize buffers 115-1 to 115-$m$ of last level cache 114 to facilitate movement of data either read from storage device(s) 142 or to be written/stored to storage device(s) 142. The data movement may be responsive to data frames received from remote device(s) 170 that may include requests to access storage device(s) 142 via a read request or a write/storage request. Also, memory 134 at NW I/O device 130 may be arranged to store firmware or software implemented by the various modules or to at least temporarily maintain data associated with data frames received from remote device(s) 170.

In some examples, logic and/or features at NW I/O device 130 may be capable of tagging one or more of buffers 115-1 to 115-$m$ to indicate use of the one or more buffers for staging or at least temporarily storing data received or transmitted via one or more network connections routed between NW I/O device 130 and remote device(s) 170 through network 150. For these examples, rather than using system memory (not shown) at host device 105, buffers 115-1 to 115-$m$ in last level cache 114 may be utilized to quickly move data between storage device(s) 142 and NW I/O device 130 with the assistance of buffer manager 116. The tagging of buffers 115-1 to 115-$m$ may include the logic and/or features of NW I/O device 130 assigning an identifier to one or more of the buffers to indicate use of the one or more tagged buffers for accessing storage device 142. For example, buffer 115-1 may be tagged and a given identifier for this tagged buffer may be communicated to buffer manager 116. Subsequently when a request to access storage device(s) 142 is received in a data frame sent by remote device(s) 170 and received by NW I/O device 130, the given identifier may enable buffer manager 116 to quickly identify the particular buffer to use to stage data to be possibly moved based on the request. Also, buffer manager 116 may be capable of reviewing the request to determine whether the request is for a read or a write access and stage the data accordingly.

According to some examples, a data frame may be received at NW I/O device 130 from a remote device from among remote device(s) 170. For these examples, the data frame may include a request by the remote device to access storage device(s) 142. Logic and/or features at NW I/O device 130 may then forward to or receive from the one or more tagged buffers data associated with the request based on whether the request is to read the data from storage device(s) 142 or is to store the data to storage device(s) 142. For example, if the request is to read data from storage device(s) 142, then the data may be staged in the tagged buffer (e.g., buffer 115-1) and then received from this tagged buffer by logic and/or features of NW I/O device 130 and then transmitted to the remote device that made the request. Alternatively, if the request is to store data to storage device(s) 142, then the data may be included in the data frame received from the remote device. This data may then be forwarded to the tagged buffer by logic and/or features of NW I/O device 130 for staging of the data for eventual storage at storage device(s) 142. In some examples, buffer manager 116, based on control information for the request, may reformat the request such that storage controller 140 can respond and fulfill the request accordingly.

In some examples, communication links 135 and 145 that couple NW I/O device 130 and storage controller 140 to host device 105 may be capable of operating in compliance with one or more industry standards associated with I/O interconnects to include, but not limited to, the Peripheral Component Interconnect (PCI) Express Base Specification, revision 3.0, published in November 2010 ("PCI Express" or "PCIe").

According to some examples, storage device(s) 142 may include one or more devices into, and/or from which, data may be stored and/or retrieved, respectively. Also, for these examples, storage device(s) 142 may include non-volatile memory for the storage of data. For example, storage device(s) 142 may include, without limitation, one or more non-volatile electro-mechanical, magnetic, optical, and/or semiconductor storage devices. These devices may include hard disk drives (HDDs) or solid state drives (SSDs). The SSDs may have non-volatile types of memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, storage controller 140, storage devices 142 and communication link 145 may be capable of operating in compliance with the PCIe Specification, as well as with other industry standards associated with accessing non-volatile memory types of storage such as SSDs using a PCIe compliant communication link and/or protocols. These other industry standards may include, but are not limited to, the Non-Volatile Memory Express (NVMe) Specification, revision 1.1., published in October 2012. Storage controller 140, storage devices 142 and communication link 145 may also be capable of operating in compliance with other industry standards that may include, but are not limited to, the Serial ATA (SATA) Specification, revision 3.1, published in July 2001, the Serial Attached SCSI (SAS) Specification, revision 2.1, published in December 2010 and/or Internet SCSI (iSCSI), Request for Comments 3720, published in April 2004.

In some examples, communication channel 140 may include one or more communication links via which NW I/O device 130 may couple to network 150 and establish one or more network connections to remote device(s) that couple to network 150 via communication channel 160 that also may have one or more communication links. These communication links included in communication channel 140 or 160 may include various types of wired, wireless or optical communication mediums. For these examples, the communication links may be operated in accordance with one or more applicable communication or networking standards in any version. For example, the communication links may operate in compliance with one or more promulgated standards or specifications for wired or wireless networks by the Institute of Electrical Engineers (IEEE). These standards are specifications may include, but are not limited to, IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11") for wireless mediums or IEEE 802.3-2008, Carrier sense Multiple access with Collision Detection (CSMA/CD) Access Method and Physical Layer Specifications, Published in December 2008 (hereinafter "IEEE 802.3") for wired mediums.

In some examples, NW I/O device 130 and remote device(s) 170 may exchange data frames via network 150 in accordance with one or more protocols that may comply and/or be compatible with various types of remote direct memory access (RDMA) protocols such as internet wide area RDMA protocol (iWARP), Infiniband (IB) protocol, Ethernet protocol, transmission control protocol/internet protocol (TCP/IP) protocol and/or RDMA over converged Ethernet (RoCE) protocol. For example, the iWARP protocol may comply and/or be compatible with Recio et al., "An RDMA Protocol Specification," Internet Draft Specification, Internet Engineering Task Force (IETF), 21 Oct. 2002. Additionally, for example, the TCP/IP protocol may comply and/or be compatible with the protocols described in Internet Engineering Task Force (IETF) Request For Comments (RFC) 791 and 793, published September 1981. Also, the IB protocol may comply and/or be compatible with Infiniband™ Architecture Specification, Vol. 2, Rel. 1.3, published November 2012. Additionally, for example, the RoCE protocol may comply and/or be compatible with Supplement to Infiniband Architecture Specification, Vol. 1, Rel. 1.2.1, Annex A16: "RDMA over Converged Ethernet (RoCE)", published April 2010. NW I/O device 130 and remote device(s) 170 may also exchange data frames via network 150 in accordance with one or more protocols that may encapsulate Fibre Channel frames over Ethernet networks referred to as fiber channel over Ethernet (FCoE). FCoE may be compatible with the protocols described in drafted by the American National Standard of Accredited Standards Committee INCITS T11 Technical Committee, Fibre Channel Backbone-5(FC-BB-5) Standard, Revision 2.0, published June 2009. Many different, additional, and/or other protocols may be used for such exchange of data frames without departing from these examples (e.g., earlier and/or later-developed versions of the aforesaid, related, and/or other protocols).

Figure 2:
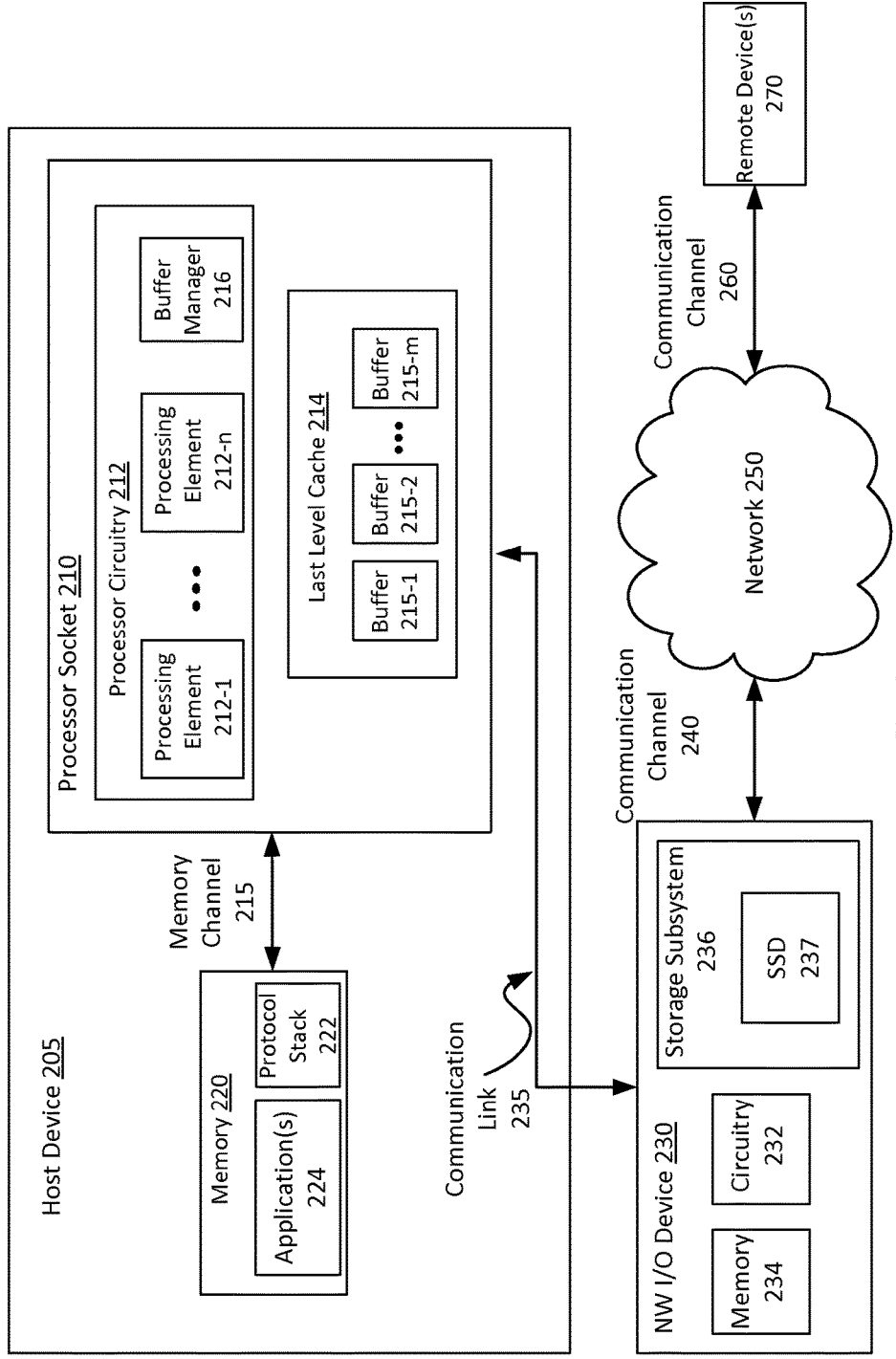
FIG. 2 illustrates a second example system.

FIG. 2 illustrates a second example system. As shown in FIG. 2, the second example includes a system 200. According to some examples, system 200 includes a host device 205 coupled to a NW I/O device 230 via a communication link 235. In some examples, remote device(s) 270 may establish one or more network connections through communication channel 260 coupled to network 250 and through communication channel 240 coupled to NW I/O device 230. For these examples, the one or more network connections between remote device(s) 270 and NW I/O device 230 may be used to receive data frames including requests to access a storage subsystem (e.g., storage subsystem 236) maintained and/or unified with NW I/O device 230.

According to some examples, NW I/O device 230 may integrate both network and storage subsystems. As a result of integrating network and storage subsystems, requests for access to storage subsystem 236 may come from either host device 205 via communication link 235 or from remote device(s) 270 via one or more network connections routed over communication channel 240. For these examples, rather than staging data for requests made by remote device(s) 270 at one or more buffers at a last level cache (e.g., buffers 215-1 to 215-$m$ of last level cache 214)), the one or more buffers may be used to exchange control information for the request (e.g., data frame header information). Data may still be staged at the one or more buffers for requests originating from host device 205 (e.g., from application(s) 224). Regardless of the source of the requests, both movements of the data do not include use of system memory (e.g., included in memory 220) for moving data between the requestor and the storage subsystem for which the requestor is seeking access.

In some examples, as shown in FIG. 2, host device 205 includes a processor socket 210 including similar components or features as mentioned for FIG. 1's host device 105. For example, processor socket 210 includes processor circuitry 212 having processing elements 212-1 to 212-$n$ and a buffer manager 216. Processor socket 210 may also include a last level cache 214 having buffers 215-1 to 215-$n$.

According to some examples, host device 205 may include a memory 220 coupled to processor socket 210 via memory channel 215. For these examples, a protocol stack 222 and application(s) 224 may be maintained in memory 220 and may be capable of being executed by processor circuitry 212. Protocol stack 222 may include protocol processing software configured or arranged to process control information associated with data frames including requests to access a storage subsystem such as storage subsystem 236 that may include an SSD 237 located at NW I/O device 230. In some examples, the data frames may originate from logic and/or features of host device 205 such as from application(s) 224 or may originate from remote device(s) 270. The data frames may include control information via which protocol stack 222 may enable host device 205 to accept or deny a request to access storage subsystem 236.

According to some examples, logic and/or features incorporated in various modules may be executed by circuitry 232 at NW I/O device 230. One or more of these modules may utilize one or more buffers 215-1 to 215-$m$ to exchange control information with protocol stack 222. For example, a data frame may be received at I/O device 230 from remote device(s) 270 that has control information in the form of a header for the data frame and may also include data in a data payload. For this example, the control information included in the header may be sent to one or more buffers 215-1 to 215-*m*. Buffer manager 216 may then facilitate the exchange of that control information between protocol stack 222 and the one or more modules. A determination may then be made based on the exchanged information as to whether a request included in the data frame is for reading data from or storing data to storage subsystem 236.

In some examples, a common or same protocol format may be used for data frames received either from logic and/or features of host device 205 via communication link 235 or from remote device(s) 270 via a network connection routed through communication channel 240. The same protocol format may include such protocols as FCoE, iWARP, Infiniband or RoCE. For these examples, the various modules executed by circuitry 232 at NW I/O device 230 may receive requests to access storage subsystem 236 that are encapsulated using a same protocol format whether from a local connection such as communication link 235 or via a network connection routed through communication channel 240 to network 250.

In some examples, similar to system 100's communication links 135 and 145, communication link 235 of system 200 may be capable of operating in compliance with one or more industry standards or specifications associated with I/O interconnects to include PCIe. Also, one or more of the modules to be executed by circuitry 232 at NW I/O controller 230 and at least SSD 237 of storage subsystem 236 may be capable of operating in compliance with the NVMe specification. Also, communication channels 240 or 260 may include various types of wired, wireless or optical communication mediums. For these examples, the communication mediums as well as network 250 may be operated in accordance with one or more applicable communication or networking standards in any version to include, but not limited to, IEEE 802.11 or IEEE 802.3 to name a few.

Figure 3:
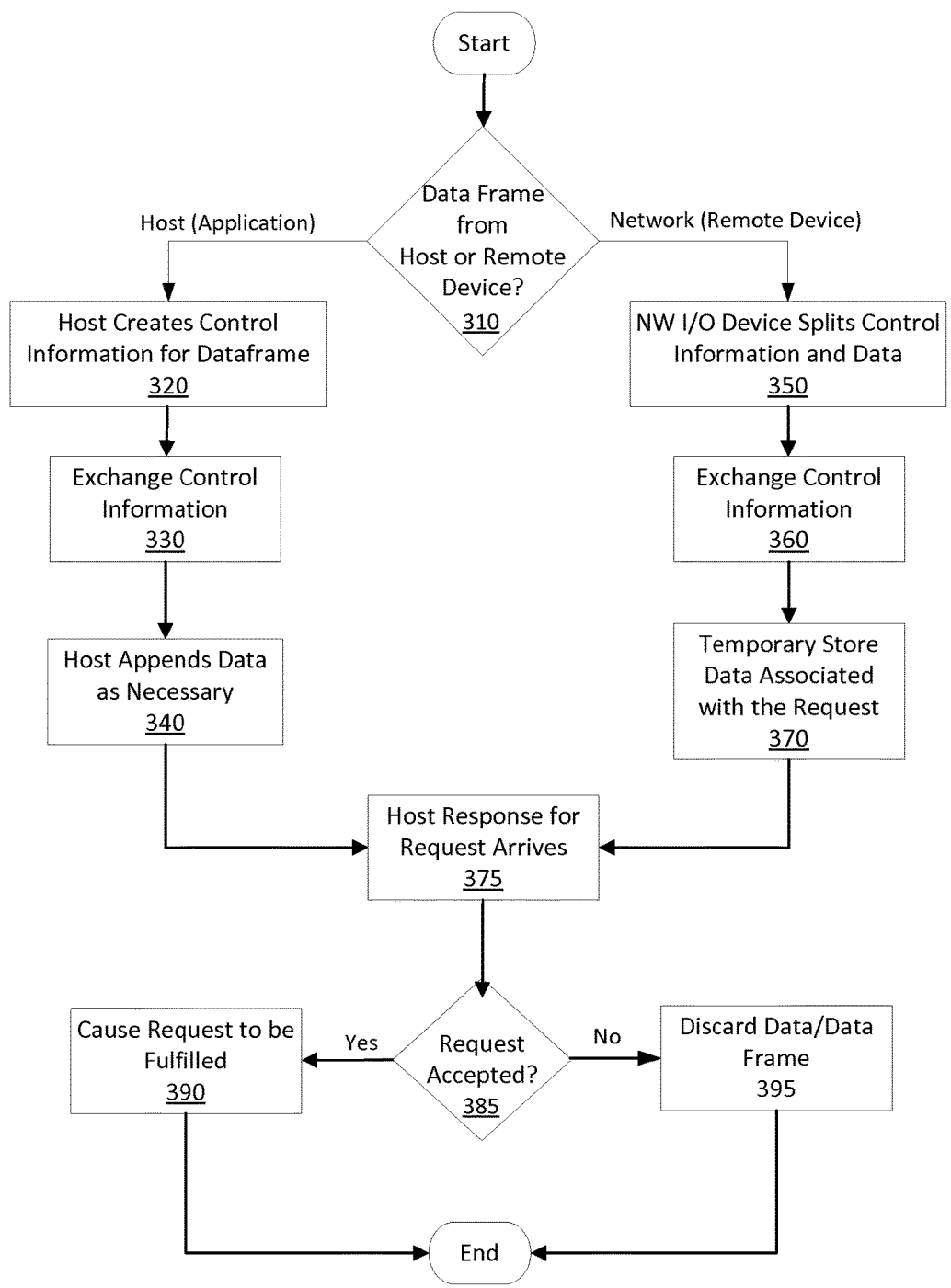
FIG. 3 illustrates an example process.

FIG. 3 illustrates an example process 300. In some examples, elements of systems 100 or 200 as shown in FIG. 1 or 2 may be used to illustrate example operations related to the flow chart for process 300 depicted in FIG. 3. The described example operations are not limited to implementations on systems 100 or 200 described in FIG. 1 or 2.

Moving from the start to decision block 310 (Data Frame from Host or Remote Device?), a data frame including a request to access storage subsystem 236 may be received from either host device 205 or from remote device(s) 270. According to some examples, a request to access storage subsystem 236 may originate from application(s) 224 and thus the data frame is deemed as from host device 205. For these examples, the process moves to block 320. Otherwise, if the data frame is received from remote device(s) 270 the process moves to block 350.

Moving from decision block 310 to block 320 (Host Creates Control Information for Data Frame), protocol stack 222 may create control information for a data frame that includes a request for application(s) 224 to access storage subsystem 236. In some examples, elements of host device 205 may first validate/authenticate the request and then create the control information once the request has been validated, e.g., application(s) 224 has adequate access privileges to access storage subsystem 236. For these examples, the control information may be associated with a protocol format commonly being used for data frames including request to access storage subsystem 236. For example, the common protocol format may be associated with FCoE, iWARP, Infiniband or RoCE. The control information, for example, may be part of a header for the data frame that is to be routed to NW I/O device 230.

Proceeding from block 320 to block 330 (Exchange Control Information), control information may be for the data frame from application(s) 224 that may be exchanged between protocol stack 222 and logic and/or features of NW I/O device 230. According to some examples, one or more buffers 215-1 to 215-*m* may be utilized to exchange the control information. For example, the control information may include an indication of whether applications(s) 224 has requested read access or storage access to storage subsystem 236 and also may include further details as to what data is to be read or how much data is to be stored. NW I/O device 230 may also provide information to indicate whether storage subsystem 236 has an ability to meet the access request.

Proceeding from block 330 to block 340 (Host Appends Data as Necessary), protocol stack 222 may append or add data associated with the request to the data frame. In some examples, if the request is for read access to storage subsystem 236 no data may be appended. Alternatively, if the request is for storage access, the data to be stored to storage subsystem 236 may be appended to the data frame.

Moving from decision block 310 to block 350 (NW I/O Device Splits Control Information and Data), logic and/or features at NW I/O device 230 may split control information from the data frame received from remote device(s) 270. According to some examples, the control information may be included in a header portion of the data frame. For these examples, the data frame may be in the common protocol format used for requests to access storage subsystem 236. For example, as mentioned above, the common protocol format may be associated with FCoE, iWARP, Infiniband or RoCE.

Proceeding from block 350 to block 360 (Exchange Control Information), logic and/or features at NW I/O device 230 may exchange the split out control information with protocol stack 222 at host device 205. In some examples, as mentioned above, one or more buffers 215-1 to 215-*m* may be utilized to exchange the control information. For example, the control information may include an indication of whether remote device(s) 270 has requested read access or storage access to storage subsystem 236 and also may include further details as to what data is to be read or how much data is to be stored. NW I/O device 230 may also provide information to indicate whether storage subsystem 236 has an ability to meet the access request.

Proceeding from block 360 to block 370 (Temporarily Store Data Associated with the Request), logic and/or features at NW I/O device 230 may store data associated with the request. In some examples, the data may be at least temporarily stored at memory 236 if the data frame received from remote device(s) 270 includes data to be stored to storage subsystem 236. For these examples, the data may be only temporarily stored to wait for a response to the request based on the information exchanged at block 360.

Moving from either block 340 or block 370 (Host Response for Request Arrives), protocol stack 222 may send a response to the request to access storage subsystem 236 included in the data frame received at NW I/O device 230. According to some examples, the response may be based on the information exchanged at either block 330 or block 360.

Proceeding from block 375 to decision block 385 (Request Accepted?), logic and/or features at NW I/O device 230 may determine whether or not the request has been accepted for access to storage subsystem 236. In some examples, the request may be accepted based on the control information exchanged indicating that storage subsystem 236 has an ability to service the request (e.g., has space available, has the data requested or the requester has adequate access rights). If the request is accepted the process moves to block 390. Otherwise the process moves to block 395.

Moving from decision block 385 to block 390 (Cause Request to be Fulfilled), the request included in the received data frame is caused to be fulfilled and the process comes to an end. According to some examples, logic and/or features at NW I/O device 230 may cause a controller (not shown) included with or at storage devices within storage subsystem 236 (e.g., with SSD 237) to fulfill the access request. For examples where the request is from application(s) 224 to store data, the logic and/or features at NW I/O device may utilize one or more buffers 215-1 to 215-$m$ to receive or pull data staged or temporarily stored to these buffers by application(s) 224. For examples where the request is a storage request from remote device(s) 270, the logic and/or features may pull the data from memory 237 that was utilized to temporarily store the data included in a data frame received from remote device(s). Also, for examples where the request is a read request from application(s) 224 to read data from storage subsystem 236, the read data may be pushed or staged to one or more buffers 215-1 to 215-$m$. Also, for examples where the request is a read request from remote device(s) 270, the read data may be included in a data frame and sent to remote device(s) 270 via the network connection routed over communication channels 240 and 260 and through network 250.

Moving from decision block 385 to block 395 (Discard Data/Data Frame), the data and/or the data frame may be discarded if the request for access to storage subsystem 236 is rejected and the process comes to an end. In some examples, any data temporarily stored to memory 236 from a data frame received from remote device(s) 270 may be discarded. In other examples, any data possibly staged from application(s) 224 to any of buffers 215-1 to 215-$m$ may be discarded.

Figure 4:
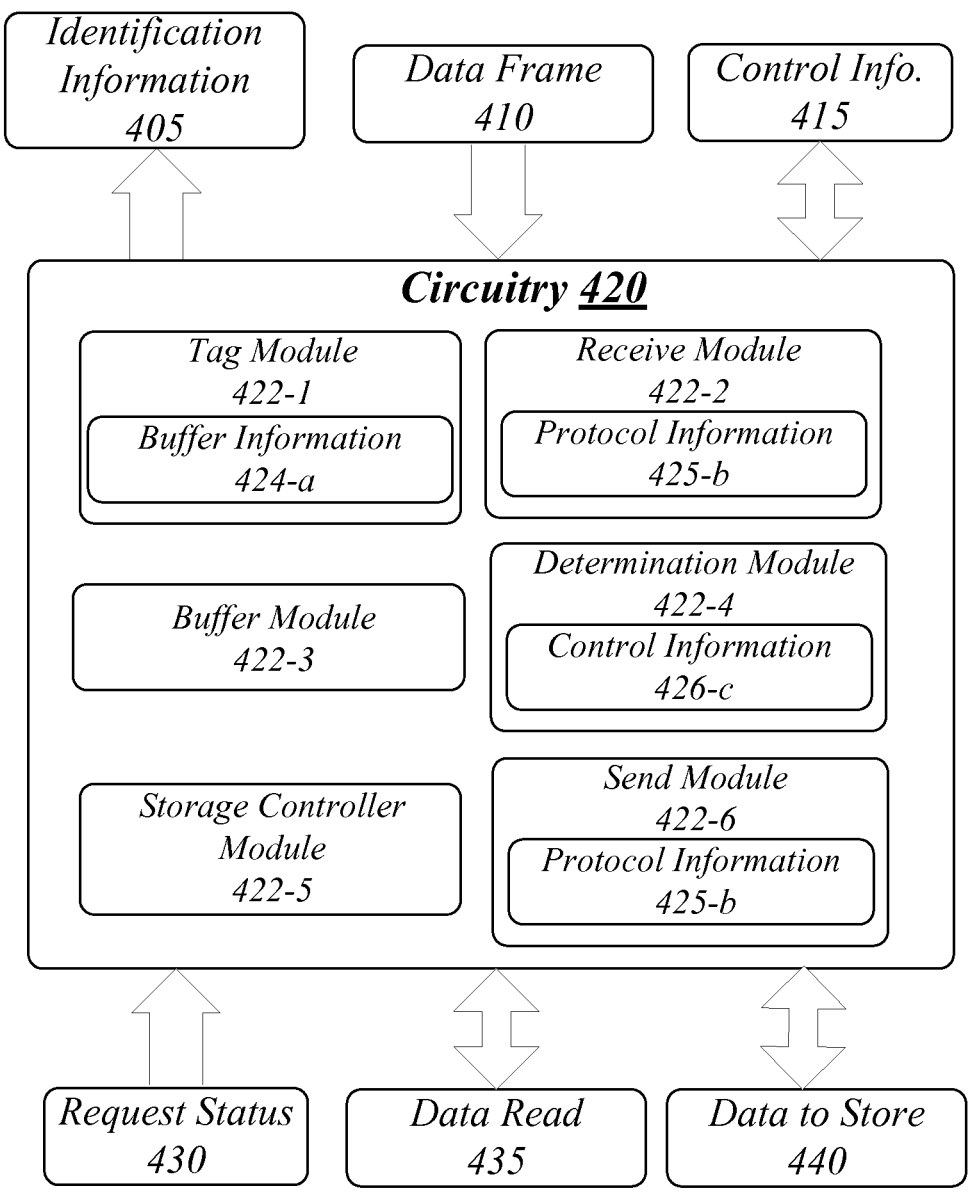
FIG. 4 illustrates an example block diagram for an apparatus.

FIG. 4 illustrates an example block diagram of an apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may be supported by circuitry 420 maintained at a NW I/O device coupled to a host device (e.g., circuitry 132/232 of NW I/O device 130/230). Circuitry 420 may be arranged to execute one or more software or firmware implemented components or modules 422-$a$. It is worthy to note that "a" and "b" and "c" and similar designators as used herein are intended to be variables representing any positive integer. Thus, for example, if an implementation sets a value for a=6, then a complete set of software or firmware for modules 422-$a$ may include modules 422-1, 422-2, 422-3, 422-4, 422-5 or 422-6. The examples presented are not limited in this context and the different variables used throughout may represent the same or different integer values.

According to some examples, circuitry 420 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 420 may also be an application specific integrated circuit (ASIC) and at least some modules 422-$a$ may be implemented as hardware elements of the ASIC.

According to some examples, apparatus 400 may include a tag module 422-1 for execution by circuitry 420. Tag module 422-1 may be capable of tagging one or more buffers maintained in a cache for processor circuitry included in a processor socket at a host device coupled to a NW I/O device including apparatus 400. The tagging of the one or more buffers may include sending identification information 405 that may include one or more identifiers assigned to the one or more buffers by tag module 422-1. The identifiers may tag certain buffers as being used for staging data received or transmitted via one or more network connections coupled to the NW I/O device. The data may be associated with requests to access a storage device controlled by a storage controller coupled to the host device. For example, storage device(s) 142 controlled by storage controller 140 as mentioned above for system 100 shown in FIG. 1. Tag module 422-1 may be capable of at least temporarily storing buffer information 424-$a$ (e.g., in a data structure such as a lookup table (LUT)). Buffer information 424-$a$ may include the identifiers assigned to the tagged buffers.

In some examples, apparatus 400 may also include a receive module 422-2 for execution by circuitry 420. Receive module 422-2 may be capable of receiving data frame 410 for a remote device as described for system 100 shown in FIG. 1 or from either one of remote device or an application being executed by processor circuitry at the host device as described for system 200 as shown in FIG. 2. Receive module 422-2 may be capable of at least temporarily storing protocol information 425-$b$ (e.g., in a LUT) to facilitate receipt of data frame 410. Protocol information 425-$b$ may enable receive module 422-2 to at least be able to decode at least header portions of data frame 410 that may be in various protocol formats associated with access to a storage device or subsystem through a NW I/O device. These various protocol formats may include, but are not limited to, FCoE, iWARP, Infiniband or RoCE protocol formats.

In some examples, apparatus 400 may also include a buffer module 422-3 for execution by circuitry 420. Buffer module 422-3 may be capable of using the one or more buffers maintained in the cache for the processor circuitry included in the processor socket for the host device. Buffer module 422-3 may be used to exchange control information included in control information (info.) 415 with a protocol stack executed by the processor circuitry at the host device. The exchanged control information may be for the access request included in data frame 410. Control info. 415, for example may include header information split from data frame 410 if a remote device had sent data frame 410 and may also include access information associated with the storage subsystem and/or storage device via which the request for access was made. In other examples, if data frame 410 was from the host device (e.g., from an application), control info. 415 may also include access information associated with the storage subsystem and/or storage device via which the request for access was made. In yet other examples, control inform. 415 may also include indications of whether the request is a read or a storage request. For all of the above examples, control information included in control info. 415 may be passed between buffer module 422-3 and the protocol stack using the one or more buffers (e.g., based on tagged identifiers). Eventually, based at least in part on the exchanged control information included in control info. 415, request status 430 may be received to indicate whether the protocol stack and/or other elements of the host device have accepted or rejected the request to access the storage subsystem and/or storage device.

According to some examples, apparatus 400 may also include a determination module 422-4 for execution by circuitry 420. Determination module 422-4 may be capable of determining whether to read from or store to the storage subsystem and/or storage device data associated with the request. For these examples, determination module 422-4 may at least temporarily store control information 426-c that includes control information in control info. 415 exchanged between buffer module 422-3 and the protocol stack.

In some examples, apparatus 400 may also include a storage controller module 422-5 for execution by circuitry 420. Storage controller module 422-5 may be capable of controlling access to the storage subsystem and/or storage device according to the determination made by determination module 422-4 and/or based also on whether the request status 430 indicates acceptance of the request.

According to some examples, the exchanged control information included in control info. 415 may indicate a read and request status 430 indicates acceptance of the request. For these examples, storage controller module 422-5 may cause the data to be read from the storage subsystem and/or storage device as data read 435. In some other examples, the exchanged control information may indicate storage and request status 430 indicates acceptance of the request. For these other examples, storage controller module 422-5 may cause data included in data to store 440 to be stored to the storage subsystem and/or storage device. This data included in data to store 440 may be retrieved from either a memory maintained at the NW I/O device (temporarily stored from data included in data frame 410) or may be pulled from one or more buffers via which the data may have been staged or temporarily stored when received from requestors at the host device (e.g., applications—also stored from data included in data frame 410).

According to some examples, apparatus 400 may also include a send module 422-6 for execution by circuitry 420. Send module 422-6 may be capable of sending data included in data read 435 to the requestor that had sent data frame 410. According to some examples, send module 422-6 may be capable of using protocol information 425-b to send the data include in data read 435 in a data frame that may be in protocol format which may include, but is not limited to, a FCoE, a iWARP, an Infiniband or a RoCE protocol format. The data frame may be sent to a remote device requester via a network connection or sent to a requestor at the host device via a local connection that couples the NW I/O device to the host device.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates an example of a first logic flow. As shown in FIG. 5, the first logic flow includes logic flow 500. Logic flow 500 may be representative of some or all of the operations executed by one or more logic, features, or devices described herein, such as apparatus 400. More particularly, logic flow 500 may be implemented by one or more of tag module 422-1, receive module 422-2, buffer module 422-3, determination module 422-4, storage controller module 422-5 or send module 422-6.

According to some examples, logic flow 500 at block 502 may receive, at a NW I/O device coupled to a host device, a data frame including a request to access a storage subsystem maintained at the NW I/O device, the storage subsystem including an SSD. For example, data frame 410 may be received by receive module 422-2 and may include a request to access a storage subsystem maintained at the NW I/O device that may include apparatus 400.

In some examples, logic flow 500 at block 504 may utilize one or more buffers maintained in a cache for processor circuitry included in a processor socket at the host device, the one or more buffers arranged to exchange control information for the request, the control information exchanged with a protocol stack executed by the processor circuitry. For example, buffer module 422-3 may use the one or more buffers to exchange control information included in control info. 415 with the protocol stack.

According to some examples, logic flow 500 at block 506 may then determine whether to read from or store to the storage subsystem data associated with the request based on the exchanged control information. For example, determination module 422-4 may use the control information included in control info. 415 to make the determination as to the type of access. As mentioned above, additional modules of apparatus 400 may then facilitate access to the storage subsystem and cause data to be stored to or read from the storage subsystem.

FIG. 6 illustrates an example of a second logic flow. As shown in FIG. 6, the second logic flow includes logic flow 600. Logic flow 600 may be representative of some or all of the operations executed by one or more logic, features, or devices described herein, such as apparatus 400. More particularly, logic flow 600 may be implemented by one or more of tag module 522-1, receive module 522-2, buffer module 522-3, determination module 522-4, storage controller module 522-5 or send module 522-6.

According to some examples, logic flow 600 at block 602 may tag one or more buffers maintained in a cache for processor circuitry included in a processor socket at a host device. For these examples, the one or more buffers may be tagged by a NW I/O device including apparatus 500 that may be coupled to the host device to indicate use of the one or more buffers for staging data received or transmitted via one or more network connections coupled to the NW I/O device, the data associated with requests to access a storage device controlled by a storage controller coupled to the host device. For example, tag module 522-1 may provide tag identification information 505 to tag the one or more buffers for use to stage received data.

In some examples, logic flow 600 at block 604 may receive a data frame including a request by a remote device to access the storage device. For example, receive module 522-2 may receive data frame 510 that include the request by the remote device.

According to some examples, logic flow 600 at block 606 may then forward to or receive from the one or more tagged buffers data associated with the request based on whether the request is to read the data from the storage device or is to store the data to the storage device. For example, determination module 522-4 may determine whether the access request included in data frame 510 is for a read or a store to the storage device. As a result of a determination of a read, storage controller module 422-5 may cause data included in data read 435 to be read from the storage device and this data may be staged to the one or more tagged buffers. Buffer module 422-3 may then pull the data included in data read 435 from the one or more tagged buffers and provide the data to send module 422-6. Send module 422-6 may then send the data included in data read 435 to the remote device. Alternatively, as a result of a determination of a store, buffer module 422-3 may stage data included in data to store 440 to the tagged one or more buffers. For this alternative, the staged data may have been obtained from data frame 410. Storage controller module 422-5 may then cause this staged data included in data to store 440 to be stored to storage device.

Figure 7:
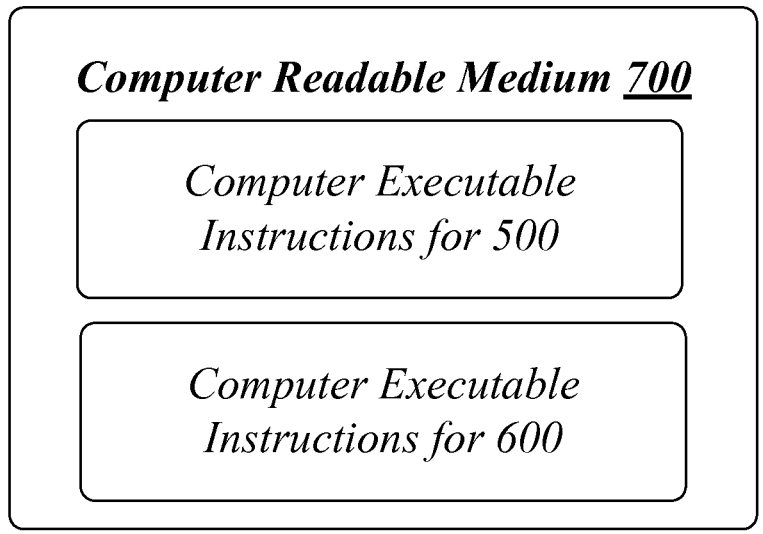
FIG. 7 illustrates an example of a storage medium.

FIG. 7 illustrates an example of a computer readable medium 700. Computer readable medium 700 may comprise an article of manufacture. In some examples, computer readable medium 700 may include any non-transitory computer readable medium or machine readable medium, such as an optical, magnetic or semiconductor storage. Computer readable medium 700 may store various types of computer executable instructions, such as instructions to implement logic flow 500 or logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
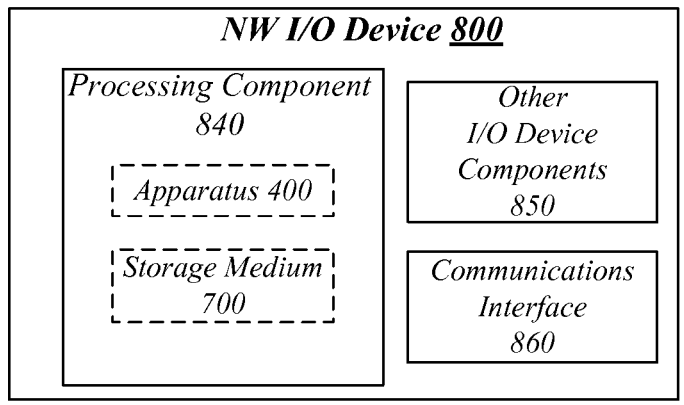
FIG. 8 illustrates an example of a network input/output device.

FIG. 8 illustrates an example NW I/O device 800. In some examples, as shown in FIG. 8, NW I/O device 800 may include a processing component 840, other platform components or a communications interface 860. According to some examples, NW I/O device 800 may be implemented in a NW I/O device coupled to a host or client device as mentioned above. In some examples, NW I/O device 800 may or may not include a storage subsystem that further includes a storage device such as an SSD.

According to some examples, processing component 840 may execute processing operations or logic for apparatus 400 and/or computer readable medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other I/O components 850 may include without limitation various types of storage mediums in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards or specifications (including progenies and variants) such as those associated with the PCIe specification, the NVMe specification, the RDMA Protocol specifications (e.g. iWARP, RoCE, Infiniband, the IEEE 802.3 or 802.11 specifications, RFC 791, RFC 793 or the FCoE standard.

The components and features of NW I/O device 800 may be implemented using any combination of discrete circuitry, application specific integrated circuits (ASICs), logic gates and/or single chip architectures. Further, the features of NW I/O device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

It should be appreciated that the exemplary NW I/O device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example apparatus for a network I/O device coupled to a host device may include circuitry. The example first apparatus may also include a receive module for execution by the circuitry to receive a data frame that includes a request to access a storage subsystem maintained at the network I/O device. The storage subsystem may include an SSD. The example first apparatus may also include a buffer module for execution by the circuitry to use one or more buffers maintained in a cache for processor circuitry included in a processor socket at the host device. The one or more buffers may be used to exchange control information for the request. the control information may be exchanged with a protocol stack executed by the processor circuitry. The example first apparatus may also include a determination module for execution by the circuitry to determine whether to read from or store to the storage subsystem data associated with the request based on the exchanged control information.

According to some examples, the example apparatus may also include a storage controller module to control access to the storage subsystem based on the determination by the determination module.

In some examples for the example apparatus, the storage controller module and at least the SSD may be arranged to operate in compliance with one or more industry standards to include PCIe Base Specification, revision 3.0 or NVMe Specification, revision 1.1.

According to some examples for the example apparatus, the receive module may receive the data frame from the host device via a local connection with the host device or from a remote device via a network connection with the remote device, the data frame configured in compliance with a same protocol format whether received from the host device or the remote device.

In some examples for the example apparatus, the same protocol format may include FCoE, iWARP, Infiniband or RoCE.

According to some examples for the example apparatus, the receive module may receive the data frame from the host device and the request included in the data frame is for an application executed by the processor circuitry to access the storage subsystem.

According to some examples for the example apparatus, the request from the application may store data associated with the data frame to the storage subsystem. The data at least temporarily stored to the one or more buffers prior to fulfilling the request to store the data to the storage subsystem.

In some examples for the example apparatus, the request from the application may read data from the storage subsystem. The read data at least temporarily stored to the one or more buffers after fulfilling the request to read the data from the storage subsystem.

According to some examples for the example apparatus, the control information for the request may include header information associated with the data frame to facilitate a determination by the protocol stack executed by the processor circuitry as to whether to accept or deny the request.

In some examples for the example apparatus, the receive module may receive the data frame from the remote device and the request may be for the remote device to store data associated with the data frame to the storage subsystem. The data at least temporarily stored to a memory maintained at the network I/O device and then caused to be stored to the storage subsystem following acceptance of the request.

According to some examples for the example apparatus, the receive module may receive the data frame from the remote device and the request is for the remote device to read data from the storage subsystem.

In some examples, the example apparatus may also include a send module for execution by the circuitry to send the read data to the remote device via the network connection following acceptance of the request.

According to some examples for the example apparatus, the local connection with the host device may be arranged to operate in compliance with one or more industry standards including PCIe Base Specification, revision 3.0.

In some examples, example first methods implemented at a network I/O device coupled to a host device may include receiving a data frame including a request to access a storage subsystem maintained at the network I/O device. For these examples, the storage subsystem may include an SSD. The example first methods may also include utilizing one or more buffers maintained in a cache for processor circuitry included in a processor socket at the host device. The one or more buffers may be arranged to exchange control information for the request. The control information may be exchanged with a protocol stack executed by the processor circuitry. The example first methods may also include determining whether to read from or store to the storage subsystem data associated with the request based on the exchanged control information.

According to some examples for the example first methods, the data frame may be received from the host device via a local connection with the host device or from a remote device via a network connection with the remote device. For these examples, the data frame may be configured in compliance with a same protocol format whether received from the host device or the remote device.

In some examples for the example first methods, the same protocol format may include FCoE, iWARP, Infiniband or RoCE.

According to some examples for the example first methods, the data frame may be received from the host device and the request included in the data frame is for an application executed by the processor circuitry to access the storage subsystem.

In some examples for the example first methods, the request from the application may be to store data associated with the data frame to the storage subsystem. The data at least temporarily stored to the one or more buffers prior to fulfilling the request to store the data to the storage subsystem.

According to some examples for the example first methods, the request from the application may be to read data from the storage subsystem. The read data at least temporarily stored to the one or more buffers after fulfilling the request to read the data from the storage subsystem.

In some examples for the example first methods, the control information for the request to include header information associated with the data frame may be to facilitate a determination by the protocol stack executed by the processor circuitry as to whether to accept or deny the request.

According to some examples for the example first methods, the data frame may be received from the remote device and the request is for the remote device to store data associated with the data frame to the storage subsystem. The data at least temporarily stored to a memory maintained at the network I/O device and then stored to the storage subsystem following acceptance of the request.

In some examples for the example first methods, the data frame may be received from the remote device and the request is for the remote device to read data from the storage subsystem. For these examples, the read data may be sent to the remote device via the network connection following acceptance of the request.

According to some examples for the example first methods, the SSD included in the storage subsystem may have non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples for the example first methods, the local connection with the host device may be arranged to operate in compliance with one or more industry standards including PCIe Base Specification, revision 3.0.

In some examples, a first at least one machine readable medium comprising a plurality of instructions that in response to being executed on a network I/O device coupled to a host device causes the network I/O device to receive a data frame including a request to access a storage subsystem maintained at the network I/O device, the storage subsystem including an SSD. The instructions may also cause the network I/O device to utilize one or more buffers maintained in a cache for processor circuitry included in a processor socket at the host device. The one or more buffers may be arranged to exchange control information for the request. The control information may be exchanged with a protocol stack executed by the processor circuitry. The instructions may also cause the network I/O device to determine whether to read from or store to the storage subsystem data associated with the request based on the exchanged control information.

According to some examples for the first at least one machine readable medium, the data frame may be received from the host device via a local connection with the host device or from a remote device via a network connection with the remote device. The data frame may be configured in compliance with a same protocol format whether received from the host device or the remote device.

In some examples for the first at least one machine readable medium, the same protocol format to may include FCoE, iWARP, Infiniband or RoCE.

According to some examples for the first at least one machine readable medium, the data frame may be received from the host device and the request included in the data frame is for an application executed by the processor circuitry to access the storage subsystem.

In some examples for the first at least one machine readable medium, the request from the application may be to store data associated with the data frame to the storage subsystem. For these examples, the data at least temporarily stored to the one or more buffers prior to fulfilling the request to store the data to the storage subsystem.

According to some examples for the first at least one machine readable medium, the request from the application may be to read data from the storage subsystem. The read data at least temporarily stored to the one or more buffers after fulfilling the request to read the data from the storage subsystem.

In some examples for the first at least one machine readable medium, the control information for the request may include header information associated with the data frame to facilitate a determination by the protocol stack executed by the processor circuitry as to whether to accept or deny the request.

According to some examples for the first at least one machine readable medium, the data frame may be received from the remote device and the request is for the remote device to store data associated with the data frame to the storage subsystem. The instructions may also cause the network I/O device to at least temporarily store the data to a memory maintained at the network I/O device and then cause the data to be stored to the storage subsystem following acceptance of the request.

In some examples for the first at least one machine readable medium, the data frame may be received from the remote device and the request is for the remote device to read data from the storage subsystem. The instructions may also cause the network I/O device to send the read data to the remote device via the network connection following acceptance of the request.

According to some examples for the first at least one machine readable medium, the local connection with the host device may be arranged to operate in compliance with one or more industry standards including PCIe Base Specification, revision 3.0.

In some examples, example second methods implemented at a network I/O device coupled to a host device may include tagging one or more buffers maintained in a cache for processor circuitry included in a processor socket at the host device. The one or more buffers may be tagged by a network I/O device coupled to the host device to indicate use of the one or more buffers for staging data received or transmitted via one or more network connections coupled to the network I/O device. The data may be associated with requests to access a storage device controlled by a storage controller coupled to the host device. The example second methods may also include receiving a data frame including a request by a remote device to access the storage device. The example second methods may also include forwarding to or receiving from the one or more tagged buffers data associated with the request based on whether the request is to read the data from the storage device or is to store the data to the storage device.

According to some examples for the example second methods, tagging the one or more buffers may include assigning an identifier to the one or more buffers to indicate use of the one or more tagged buffers for accessing the storage device based on one or more requests included in one or more data frames received from the remote device.

In some examples for the example second methods, the storage device include an SSD and the storage controller and the SSD may be arranged to operate in compliance with one or more industry standards to include PCIe Base Specification, revision 3.0 or NVMe Specification, revision 1.1.

According to some examples for the example second methods, the SSD having non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples for the example second methods, the data frame may be configured in compliance with a protocol format to include FCoE, iWARP, Infiniband or RoCE.

In some examples, a second at least one machine readable medium comprising a plurality of instructions that in response to being executed on a network I/O device coupled to a host device causes the network I/O device to tag one or more buffers maintained in a cache for processor circuitry included in a processor socket at a host device. The one or more buffers may be tagged by the network I/O device to indicate use of the one or more buffers for staging data received or transmitted via one or more network connections coupled to the network I/O device. The data may be associated with requests to access a storage device controlled by a storage controller coupled to the host device. The instructions may also cause the network I/O device to receive a data frame including a request by a remote device to access the storage device. The instructions may also cause the network I/O device to forward to or receive from the one or more tagged buffers data associated with the request based on whether the request is to read the data from the storage device or is to store the data to the storage device.

According to some examples for the second at least one machine readable medium, instructions to tag the one or more buffers may include the instructions to cause the network I/O device to assign an identifier to the one or more buffers to indicate use of the one or more tagged buffers for accessing the storage device based on one or more requests included in one or more data frames received from the remote device.

In some examples for the second at least one machine readable medium, the storage device may include an SSD and the storage controller and the SSD may be arranged to operate in compliance with one or more industry standards to include PCIe Base Specification, revision 3.0 or NVMe Specification, revision 1.1.

According to some examples for the second at least one machine readable medium, the SSD may have non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples for the second at least one machine readable medium, the data frame configured in compliance with a protocol format to include FCoE, iWARP, Infiniband or RoCE.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a network input/output (I/O) device;
   a receive module for execution by the circuitry to receive, from a host device coupled to the network I/O device via a local connection with the host device or from a remote device via a network connection with the remote device, a data frame that includes a request to access a storage subsystem maintained at the network I/O device, the storage subsystem including a solid state drive (SSD), the data frame to be configured in compliance with a same protocol format whether received from the host device or the remote device;
   a buffer module for execution by the circuitry to use one or more buffers maintained in a cache for processor circuitry included in a processor socket at the host device coupled to the network I/O device, the one or more buffers used to exchange control information for the request, the control information exchanged with a protocol stack executed by the processor circuitry; and
   a determination module for execution by the circuitry to determine, based on the exchanged control information, whether to read from or store to the storage subsystem, data associated with the request, the control information for the request to include header information associated with the data frame to facilitate a determination by the protocol stack executed by the processor circuitry as to whether to accept or deny the request.

2. The apparatus of claim 1, comprising:
   a storage controller module to control access to the storage subsystem based on the determination by the determination module.

3. The apparatus of claim 2, comprising the storage controller module and at least the SSD are arranged to operate in compliance with one or more industry standards to include PCIe Base Specification, revision 3.0 or NVMe Specification, revision 1.1.

4. The apparatus of claim 1 comprising the same protocol format to include fiber channel over Ethernet (FCoE), internet wide area RDMA protocol (iWARP), Infiniband or RDMA over converged Ethernet (RoCE).

5. The apparatus of claim 1, comprising the receive module to receive the data frame from the remote device and the request is for the remote device to store data associated with the data frame to the storage subsystem, the data at least temporarily stored to a memory maintained at the network I/O device and then caused to be stored to the storage subsystem following acceptance of the request.

6. The apparatus of claim 5, comprising the receive module to receive the data frame from the remote device and the request is for the remote device to read data from the storage subsystem.

7. The apparatus of claim 6, comprising:
   a send module for execution by the circuitry to send the read data to the remote device via the network connection following acceptance of the request.

8. The apparatus of claim 6, the local connection with the host device arranged to operate in compliance with one or more industry standards including PCIe Base Specification, revision 3.0.

9. The apparatus of claim 1, control information comprising stage data associated with a data frame.

10. A method comprising:
    receiving, at a network input/output (I/O) device, a data frame including a request to access a storage subsystem maintained at the network I/O device, the storage subsystem including a solid state drive (SSD), the data frame received from a host device via a local connection with the host device or from a remote device via a network connection with the remote device, the data frame to be configured in compliance with a same protocol format whether received from the host device or the remote device;
    utilizing one or more buffers maintained in a cache for processor circuitry included in a processor socket at the host device coupled with the network I/O device, the one or more buffers arranged to exchange control information for the request, the control information exchanged with a protocol stack executed by the processor circuitry; and
    determining, based on the exchanged control information, whether to read from or store to the storage subsystem, data associated with the request, the control information for the request to include header information associated with the data frame to facilitate a determination by the protocol stack executed by the processor circuitry as to whether to accept or deny the request.

11. The method of claim 10, comprising the same protocol format to include fiber channel over Ethernet (FCoE), internet wide area RDMA protocol (iWARP), Infiniband or RDMA over converged Ethernet (RoCE).

12. The method of claim 10, comprising the data frame received from the host device and the request included in the data frame is for an application executed by the processor circuitry to access the storage subsystem.

13. The method of claim 12, comprising the request from the application to store data associated with the data frame to the storage subsystem, the data at least temporarily stored to the one or more buffers prior to fulfilling the request to store the data to the storage subsystem.

14. The method of claim 12, comprising the request from the application to read data from the storage subsystem, the read data at least temporarily stored to the one or more buffers after fulfilling the request to read the data from the storage subsystem.

15. The method of claim 10, comprising the SSD included in the storage subsystem having non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

16. At least one non-transitory machine readable medium comprising a plurality of instructions that in response to being executed on a network input/output (I/O) device coupled to a host device causes the network I/O device to:

receive a data frame including a request to access a storage subsystem maintained at the network I/O device, the storage subsystem including a solid state drive (SSD), the data frame received from the host device via a local connection with the host device or from a remote device via a network connection with the remote device, the data frame to be configured in compliance with a same protocol format whether received from the host device or the remote device;

utilize one or more buffers maintained in a cache for processor circuitry included in a processor socket at the host device, the one or more buffers arranged to exchange control information for the request, the control information exchanged with a protocol stack executed by the processor circuitry; and determine, based on the exchanged control information, whether to read from or store to the storage subsystem, data associated with the request, the control information for the request to include header information associated with the data frame to facilitate a determination by the protocol stack executed by the processor circuitry as to whether to accept or deny the request.

17. The at least one non-transitory machine readable medium of claim 16, comprising the same protocol format to include fiber channel over Ethernet (FCoE), internet wide area RDMA protocol (iWARP), Infiniband or RDMA over converged Ethernet (RoCE).

18. A method comprising:

tagging one or more buffers maintained in a cache for processor circuitry included in a processor socket at a host device, the one or more buffers tagged by a network input/output (I/O) device coupled to the host device to indicate use of the one or more buffers for staging data received or transmitted via one or more network connections coupled to the network I/O device, the data associated with requests to access a storage device controlled by a storage controller coupled to the host device;

receiving a data frame including a request by a remote device to access the storage device; and forwarding to or receiving from the one or more tagged buffers data associated with the request based on whether the request is to read the data from the storage device or is to store the data to the storage device.

19. The method of claim 18, tagging the one or more buffers comprises assigning an identifier to the one or more buffers to indicate use of the one or more tagged buffers for accessing the storage device based on one or more requests included in one or more data frames received from the remote device.

20. The method of claim 18, the storage device comprises a solid state drive (SSD) and the storage controller and the SSD are arranged to operate in compliance with one or more industry standards to include PCIe Base Specification, revision 3.0 or NVMe Specification, revision 1.1.

21. The method of claim 20, comprising the SSD having non-volatile memory that includes at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

22. The method of claim 18, comprising the data frame configured in compliance with a protocol format to include fiber channel over Ethernet (FCoE), internet wide area RDMA protocol (iWARP), Infiniband or RDMA over converged Ethernet (RoCE).

* * * * *